United States Patent
Kramer

Patent Number: 5,986,546
Date of Patent: Nov. 16, 1999

[54] OIL CONTAMINATION DETECTION ASSEMBLY

[75] Inventor: Dennis A. Kramer, Troy, Mich.

[73] Assignee: Meritor Heavy Vehicle Systems, LLC

[21] Appl. No.: 09/168,058

[22] Filed: Oct. 7, 1998

[51] Int. Cl.[6] .................................................. B60Q 1/00

[52] U.S. Cl. .................. 340/453; 188/1.11 R; 303/3; 303/20

[58] Field of Search .................. 340/453; 188/1.11, 188/1.11 R; 60/329; 303/20, 3

[56] References Cited

U.S. PATENT DOCUMENTS

| | | | |
|---|---|---|---|
| 4,316,640 | 2/1982 | Cripe | 303/20 |
| 5,076,056 | 12/1991 | Schmidt et al. | 60/329 |
| 5,494,342 | 2/1996 | Engle | 303/3 |

*Primary Examiner*—Jeffery A. Hofsass
*Assistant Examiner*—Tai T. Nguyen

[57] ABSTRACT

An oil contamination detection assembly includes a resistor having a known resistance which is exposed to the air of a vehicle brake system to accumulate a layer of oil contaminating the air. A heater boils non-carbon elements off the resistor, leaving a carbon residue which decreases the resistance of the resistor. A threshold detector circuit produces an oil contamination warning signal when the decreased resistance of the resistor is less than a predetermined value. The oil contamination detection assembly may be installed in an air line within the pneumatic brake system or integrated into an air dryer within the pneumatic brake system.

9 Claims, 2 Drawing Sheets

5,986,546

OIL CONTAMINATION DETECTION ASSEMBLY

BACKGROUND OF THE INVENTION

This application relates to a unique assembly for detecting oil contamination in a vehicular pneumatic brake system.

Heavy vehicles, such as trucks and tractor-trailers, typically use a pneumatic brake system. Pneumatic brake systems, sometimes referred to as compressed air brake systems, use air pressure to actuate the brakes of the heavy vehicle. Typically, pneumatic brake systems include an air compressor and an air dryer. The air compressor includes a cylinder, a piston which reciprocates within the cylinder, and a piston seal disposed between the outer circumference of the piston and the inner circumference of the cylinder. The reciprocating movement of the piston is used to compress or pressurize the brake system air supply. The air dryer includes a canister filled with desiccant to remove moisture and other contaminants from the air supply. Periodically, the canister is purged to remove the moisture absorbed by the desiccant.

Pneumatic brake systems often experience an oil contamination condition, commonly referred to as "blow-by". This type of contamination occurs when lubricating oil located on one side of the air compressor piston is blown by the piston seal into the brake system air supply located on the opposing side of the piston. As the contaminated air is moved through the air dryer, the oil is absorbed by the desiccant. Unlike moisture, oil absorbed by the desiccant cannot be purged out of the air dryer. Over time, the absorption and retention of an increasing amount of oil prevents the desiccant from absorbing additional moisture, thereby allowing some moisture to pass through the air dryer into other portions of the brake system. This non-absorbed moisture can freeze inside the brake system during cold temperature conditions and damage many brake system components.

To avoid brake system damage caused by oil contamination, the air dryer must be periodically serviced by replacing the desiccant canister. Determining when to service the air dryer for excessive oil contamination is a difficult task. Accordingly, it would be desirable to provide an oil contamination detection assembly for detecting when service of the air dryer for oil contamination is necessary.

SUMMARY OF THE INVENTION

In a disclosed embodiment of this invention, an oil contamination detection assembly includes a resistor having a known resistance. The resistor is exposed to the air of a vehicle brake system to accumulate a layer of oil contaminating the air. A heater boils non-carbon elements off the resistor, leaving a carbon residue which decreases the resistance of the resistor. A threshold detector circuit produces an oil contamination warning signal when the decreased resistance of the resistor is less than a predetermined value. In this manner, the detection assembly can predict when service of the brake system for oil contamination may be necessary.

In a first embodiment of this invention, the oil contamination detection assembly is installed in an air line within the pneumatic brake system. In a second embodiment of this invention, the oil contamination detection assembly is integrated into an air dryer within the pneumatic brake system.

These and other features of the present invention will be best understood from the following specification and drawings, the following of which is a brief description.

DETAILED DESCRIPTION OF THE PREFERRED EMBODIMENT

Figure 1:
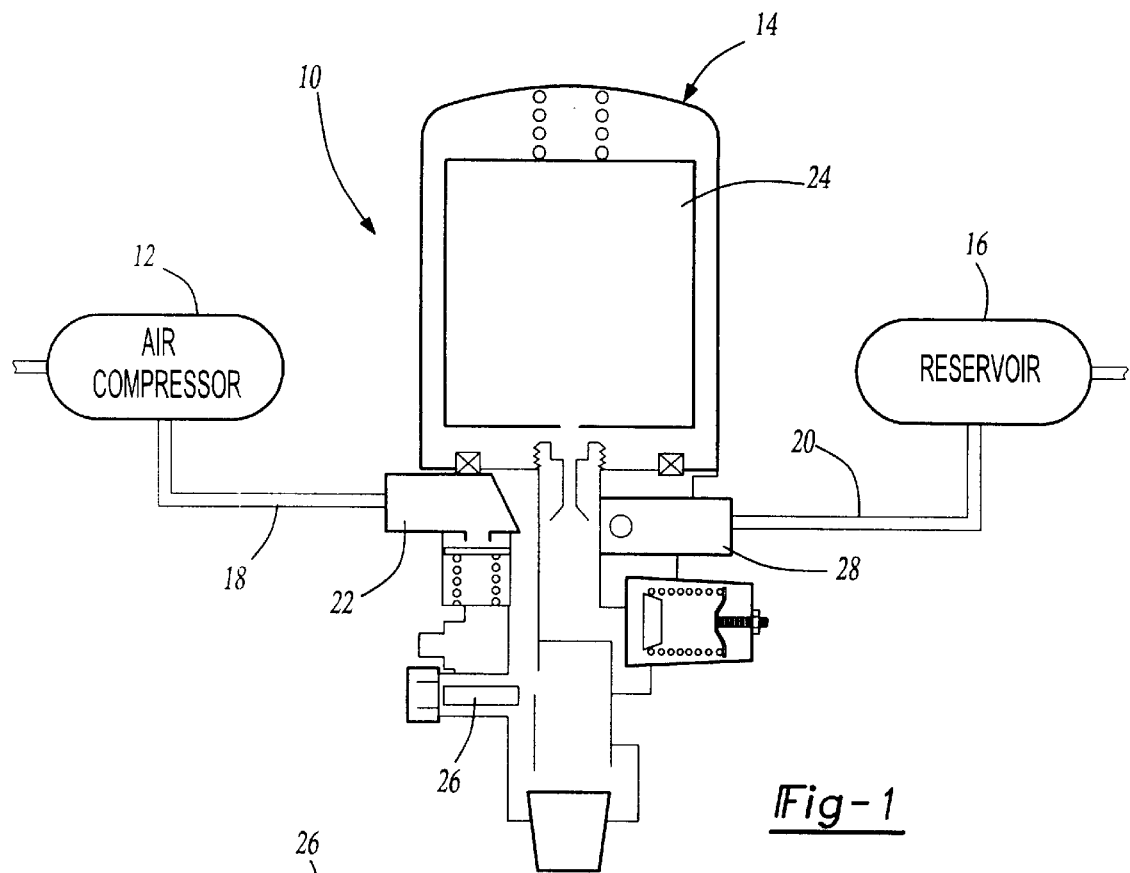
FIG. 1 is a schematic diagram of a portion of a vehicular pneumatic brake system.

FIG. 1 is a schematic diagram of a portion of a vehicular pneumatic brake system 10, sometimes referred to as a compressed air brake system. The brake system 10 includes an air compressor 12 for pressurizing or compressing an air supply, an air dryer assembly 14 for removing moisture and other contaminants from the air supply, and a reservoir 16 for storing the air supply. The air compressor 12 is in pneumatic communication with the air dryer assembly 14 via a first pneumatic line 18. The air dryer assembly 14 is in pneumatic communication with the reservoir 16 via a second pneumatic line 20.

The air compressor 12 typically receives air from an engine intake manifold or an air filter (not shown) and compresses the air, thereby forcing the compressed air through the first pneumatic line 18 to the air dryer assembly 14. The air dryer assembly 14 includes an inlet port 22 which receives the air from the first pneumatic line 18, a replaceable desiccant canister 24 which removes moisture and other contaminants, such as oil, from the air passing through the assembly 14, an air dryer heater 26 which warms the air passing through the assembly 14, thereby preventing the moisture captured in the desiccant canister 24 from freezing during cold temperature conditions, and an outlet port 28 which delivers the heated, moisture and contaminant-free, compressed air into the second pneumatic line 20. The second pneumatic line 20 directs the compressed air into the reservoir 16 for storage. The compressed air stored in the reservoir 16 is used to supply air pressure to the brakes of a vehicle (not shown).

Figure 2:
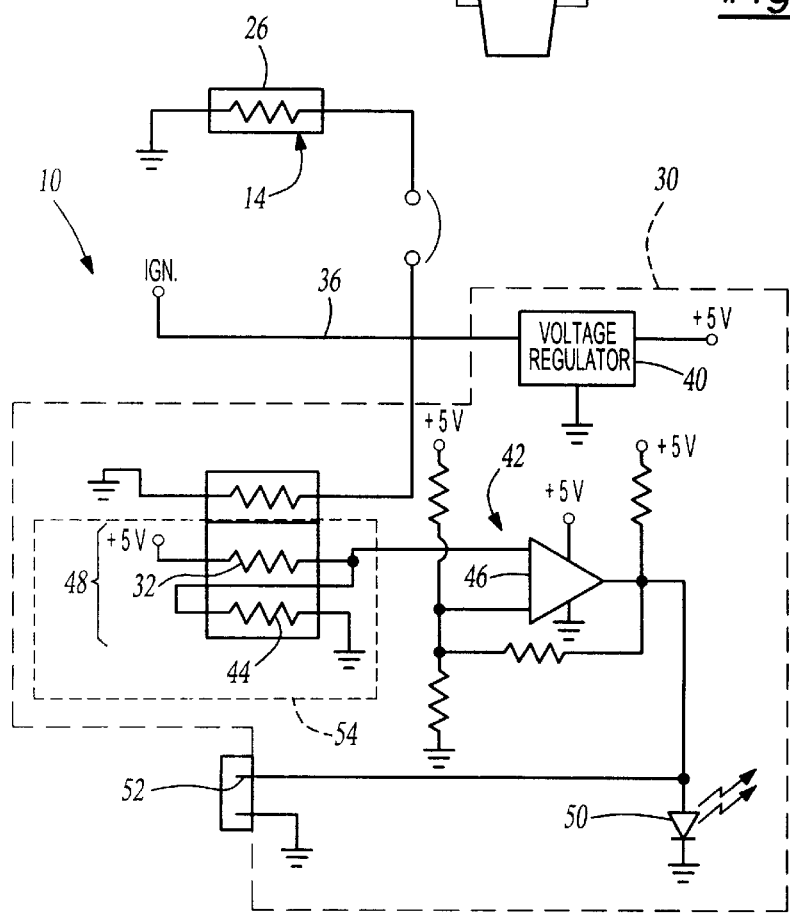
FIG. 2 is an electrical schematic diagram of a first embodiment of an oil contamination detection assembly in accordance with the present invention.

FIG. 2 is an electrical schematic diagram of a first embodiment of an oil contamination detection assembly 30 in accordance with the present invention. In this first embodiment, the detection assembly 30 is preferably installed in either the first or second pneumatic line 18 or 20. The detection assembly 30 is particularly adapted for use in the vehicular pneumatic brake system 10 having a supply of air contaminated with oil consisting of carbon and other non-carbon elements. The detection assembly 30 includes a first resistor 32, having a known resistance, which is exposed to the air of the brake system 10. As a result of this exposure, the first resistor 32 accumulates a layer of the contaminating oil. To achieve the aforementioned exposure and accumulation, the first resistor 32 is preferably installed in either the first or second pneumatic line 18 or 20.

A carbonization heater 34 is used to warm or heat the first resistor 32, preferably to approximately 300° F. This application of heat boils the non-carbon elements off the first resistor 32, leaving a carbon residue which decreases the resistance of the first resistor 32. As more and more oil accumulates on the first resistor 32, the amount of carbon residue increases, thereby further decreasing the resistance of the first resistor 32. As shown in FIG. 2, the carbonization heater 34 is connected to an ignition circuit 36 used to supply power to the air dryer heater 26 located within the dryer assembly 14. The ignition circuit 36 is also connected to a voltage regulator 40 designed to supply a constant five volt power source.

A threshold detector circuit 42 includes a second resistor 44 and a comparator circuit 46 to produce an oil contamination warning signal when the resistance of the first resistor 32 is less than a predetermined value. The second resistor 44, which is warmed by the carbonization heater 34 to the same temperature as the first resistor 32, is connected in series between the first resistor 32 and ground to form a voltage divider circuit 48. The voltage divider circuit 48 produces a measuring signal proportional to the resistance of the first resistor 32. The comparator circuit 46 receives the measuring signal and produces the oil contamination warning signal when the measuring signal is less than the predetermined value.

One of ordinary skill in the art will appreciate that the predetermined value is adjustable and may be set so as to correlate with a specific level of oil contamination within the desiccant canister 24. In this manner, the detection assembly 30 produces an adjustable oil contamination warning signal which indicates when the desiccant canister 24 should be serviced or replaced.

The oil contamination warning signal illuminates an oil contamination warning indicator 50, preferably an LED (light emitting diode) as illustrated in FIG. 2, having adjacent indicia (not shown) which instructs replacement of the desiccant canister 24. The warning signal is also transmitted to an electrical output terminal 52, preferably to illuminate a second warning indicator within the line of sight of a vehicle operator.

After the desiccant canister 24 has been serviced or replaced, the oil contamination detection assembly 30 is reset by removing the carbon residue from the first resistor 32 or by replacing the first resistor 32. As a result, the first resistor 32 is preferably housed in a cartridge 54 which is replaceable in a manner similar to a fuse.

Figure 3:
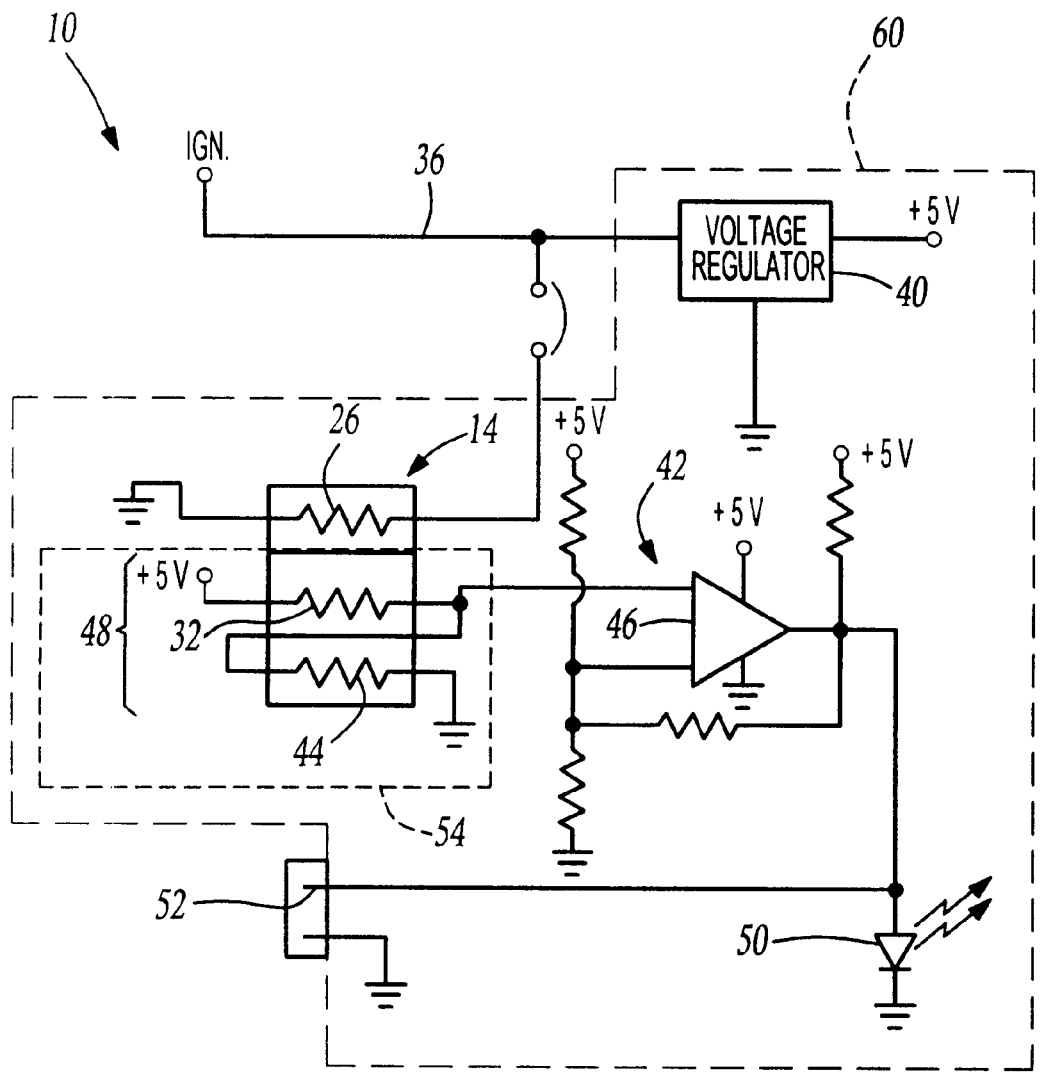
FIG. 3 is an electrical schematic diagram of a second embodiment of an oil contamination detection assembly in accordance with the present invention.

FIG. 3 is an electrical schematic diagram of a second embodiment of an oil contamination detection assembly 60 in accordance with the present invention. In this second embodiment, the detection assembly 60 is preferably integrated into the air dryer assembly 14 of the brake system 10. To reduce part cost and decrease the number of components in the detection assembly 60, the air dryer heater 26, located in the air dryer assembly 14, is used in a conventional manner (i.e. to heat the air passing through the air dryer assembly 14 so as to prevent the moisture absorbed by desiccant within the air dryer assembly 14 from freezing during cold climate conditions) and to boil the non-carbon elements off the first resistor 32. As a result, a separate carbonization heater is not required. In all other aspects, the second embodiment detection system 60 operates similar to the first embodiment detection system 30.

In accordance with the scope of the present invention, an inventive method for detecting a predetermined level of oil contamination in a vehicular pneumatic brake system having a supply of air contaminated with oil consisting of carbon and other non-carbon elements is disclosed. The method includes the steps of: exposing a resistor having a measured resistance to the air of the brake system, accumulating a layer of the oil on the resistor, boiling the non-carbon elements off the resistor with a heater leaving a carbon residue on the resistor which decreases the resistance of the resistor, determining the decreased resistance of the resistor, and producing an oil contamination warning signal in response to the decreased resistance of the resistor being less than a predetermined value. Preferably, the method further includes the step of illuminating an oil contamination warning indicator in response to the warning signal.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An oil contamination detection assembly for a vehicular pneumatic brake system having a supply of air contaminated with oil comprising:

a first resistor having a measured resistance for exposure to the air of the brake system and accumulating a layer of the oil contaminating the air; and a circuit for producing an oil contamination warning signal in response to the resistance of said first resistor being less than a predetermined value.

2. An assembly as set forth in claim 1 including a heater for boiling elements off said first resistor to leave a carbon residue to decrease the resistance of said first resistor.

3. An assembly as set forth in claim 2 including an oil contamination warning indicator for illumination in response to said warning signal.

4. An assembly as set forth in claim 2 wherein said circuit is a threshold detector circuit which includes a second resistor connected in series with said first resistor to form a voltage divider circuit for producing a measuring signal proportional to the resistance of said first resistor.

5. An assembly as set forth in claim 4 wherein said detector circuit includes a comparator circuit for receiving said measuring signal and producing said warning signal in response to said measuring signal being less than said predetermined value.

6. An assembly as set forth in claim 2 wherein the vehicular pneumatic brake system includes an air dryer assembly and the oil contamination detection assembly is integrated into said air dryer assembly.

7. An assembly as set forth in claim 6 wherein said air dryer assembly includes an air dryer heater for heating the air of the brake system and boiling elements off said first resistor.

8. A method for detecting a predetermined level of oil contamination in a vehicular pneumatic brake system having a supply of air contaminated with oil, the method comprising the steps of:

exposing a resistor having a measured resistance to the air of the brake system, accumulating a layer of the oil on the resistor, boiling elements off the resistor with a heater, leaving a carbon residue on the resistor to decrease the resistance of the resistor, and producing an oil contamination warning signal in response to the resistance of the resistor being less than a predetermined value.

9. A method as set forth in claim 8 including the step of illuminating an oil contamination warning indicator in response to the warning signal.

* * * * *